(12) United States Patent
Cormier et al.

(10) Patent No.: US 8,542,675 B2
(45) Date of Patent: *Sep. 24, 2013

(54) CUSTOMIZABILITY OF EVENT NOTIFICATION ON TELEPHONY-ENABLED DEVICES

(75) Inventors: Jean-Philippe Cormier, Ottawa (CA); Jin Kim, Ottawa (CA); M. Khaledul Islam, Kanata (CA)

(73) Assignee: BlackBerry Limited, Waterloo (CA)

( * ) Notice: Subject to any disclaimer, the term of this patent is extended or adjusted under 35 U.S.C. 154(b) by 411 days.

This patent is subject to a terminal disclaimer.

(21) Appl. No.: 12/968,925

(22) Filed: Dec. 15, 2010

(65) Prior Publication Data

US 2011/0080858 A1 Apr. 7, 2011

Related U.S. Application Data

(63) Continuation of application No. 11/179,534, filed on Jul. 13, 2005, now Pat. No. 7,881,283.

(51) Int. Cl.
*H04L 12/66* (2006.01)
*H04W 4/12* (2009.01)
*G06F 15/16* (2006.01)
*H04M 3/42* (2006.01)

(52) U.S. Cl.
USPC ............................ 370/352; 358/1.15; 370/310

(58) Field of Classification Search
USPC ................. 370/310, 352; 379/93.17, 207.02, 379/211.02, 48, 88.19, 88.23, 93.24, 204.01, 379/211.01, 265.11; 455/519, 579; 709/206, 709/217, 223; 358/1.15
See application file for complete search history.

(56) References Cited

U.S. PATENT DOCUMENTS

| 5,036,535 | A | * | 7/1991 | Gechter et al. | 379/265.11 |
|---|---|---|---|---|---|
| 5,260,986 | A | | 11/1993 | Pershan | |
| 5,271,058 | A | * | 12/1993 | Andrews et al. | 379/265.11 |
| 5,274,700 | A | * | 12/1993 | Gechter et al. | 379/211.01 |
| 5,944,786 | A | * | 8/1999 | Quinn | 709/206 |
| 5,987,102 | A | * | 11/1999 | Elliott et al. | 379/93.17 |
| 6,021,177 | A | * | 2/2000 | Allport | 379/48 |
| 6,289,092 | B1 | | 9/2001 | Nishiara | |
| 6,430,270 | B1 | * | 8/2002 | Cannon et al. | 379/88.19 |
| 6,438,124 | B1 | * | 8/2002 | Wilkes et al. | 370/352 |
| 6,496,568 | B1 | | 12/2002 | Nelson | |
| 6,647,272 | B1 | | 11/2003 | Asikainen | |
| 6,721,412 | B1 | * | 4/2004 | Youngs | 379/204.01 |
| 6,870,919 | B2 | * | 3/2005 | Dobler | 379/207.02 |

(Continued)

FOREIGN PATENT DOCUMENTS

| EP | 0865188 | 9/1998 |
|---|---|---|
| EP | 1109377 | 6/2001 |

(Continued)

*Primary Examiner* — Gerald Gauthier
(74) *Attorney, Agent, or Firm* — Perry + Currier Inc.

(57) ABSTRACT

A system and method of notifying a user of events in a customizable manner during and not during a voice call is provided. According to one aspect, the notifications are configurable to be dependant on whether or not there is an active voice call. Notifications may also be configured to be different depending on whether or not the wireless device is inside a device holster. Notifications can be configured to be different for different events so that the user may be able to associate certain notifications with certain events. The user can also configure the type of events that trigger notification. Notifications include any combination of audible cues, visual cues, and vibration cues.

22 Claims, 5 Drawing Sheets

(56) References Cited

U.S. PATENT DOCUMENTS

| | | |
|---|---|---|
| 6,879,580 B1 | 4/2005 | Djuphammar et al. |
| 7,019,622 B2 | 3/2006 | Orr et al. |
| 7,057,752 B1* | 6/2006 | Klotz, Jr. ............... 358/1.15 |
| 7,207,008 B1 | 4/2007 | Koch |
| 7,289,786 B2 | 10/2007 | Krasner |
| 7,304,983 B2 | 12/2007 | Simpson et al. |
| 7,349,532 B2 | 3/2008 | Henderson |
| 7,378,939 B2 | 5/2008 | Sengupta et al. |
| 7,458,080 B2 | 11/2008 | Parker et al. |
| 7,474,892 B2 | 1/2009 | Skinner et al. |
| 7,542,773 B2 | 6/2009 | Koch |
| 7,552,190 B1 | 6/2009 | Freishtat et al. |
| 7,616,750 B2* | 11/2009 | Cadiz et al. ............. 379/211.02 |
| 7,616,944 B2 | 11/2009 | Gustavsson et al. |
| 7,620,166 B2* | 11/2009 | Cadiz et al. ............. 379/207.02 |
| 7,881,283 B2* | 2/2011 | Cormier et al. ............. 370/352 |
| 2002/0049779 A1* | 4/2002 | Waldo et al. ............. 707/206 |
| 2002/0132639 A1 | 9/2002 | Sato |
| 2004/0127197 A1 | 7/2004 | Roskind |
| 2004/0203349 A1 | 10/2004 | Detweiler et al. |
| 2004/0203643 A1 | 10/2004 | Bhogal et al. |
| 2004/0203644 A1 | 10/2004 | Anders et al. |
| 2004/0203974 A1 | 10/2004 | Seibel |
| 2004/0225718 A1* | 11/2004 | Heinzel et al. ............. 709/206 |
| 2005/0085253 A1* | 4/2005 | Mansour ............. 455/519 |
| 2005/0144269 A1* | 6/2005 | Banatwala et al. ............. 709/223 |
| 2006/0062207 A1* | 3/2006 | Julka et al. ............. 370/352 |
| 2006/0126810 A1 | 6/2006 | Wilson et al. |
| 2006/0147002 A1 | 7/2006 | Desai et al. |
| 2006/0161615 A1 | 7/2006 | Brooks et al. |
| 2006/0161626 A1 | 7/2006 | Cardina et al. |
| 2006/0193460 A1* | 8/2006 | Cadiz et al. ............. 379/211.02 |
| 2006/0223547 A1 | 10/2006 | Chin et al. |
| 2006/0224691 A1* | 10/2006 | Dutta et al. ............. 709/217 |
| 2006/0248183 A1 | 11/2006 | Barton |
| 2006/0255963 A1 | 11/2006 | Thompson et al. |
| 2007/0014280 A1* | 1/2007 | Cormier et al. ............. 370/352 |
| 2007/0021108 A1 | 1/2007 | Bocking et al. |
| 2008/0046510 A1 | 2/2008 | Beauchamp et al. |
| 2011/0080858 A1* | 4/2011 | Cormier et al. ............. 370/310 |

FOREIGN PATENT DOCUMENTS

| | | |
|---|---|---|
| EP | 1111885 | 6/2001 |
| EP | 1441555 | 7/2004 |
| EP | 1545103 | 6/2005 |
| GB | 2370174 | 6/2002 |
| WO | 02/13555 | 2/2002 |
| WO | 2004/084016 | 9/2004 |

* cited by examiner

CUSTOMIZABILITY OF EVENT NOTIFICATION ON TELEPHONY-ENABLED DEVICES

RELATED APPLICATION

This application is a continuation of previously filed U.S. application Ser. No. 11/179,534 filed Jul. 13, 2005 hereby incorporated by reference in its entirety.

FIELD OF THE APPLICATION

This application relates to telephony-enabled devices.

BACKGROUND

Multimode wireless devices support more than one air-interface technology (e.g. GSM, cdma2000, UMTS etc.). Some air-interface technologies (such as cdma2000 release A, UMTS) support more than one concurrent service and provides users with more than one mode of operation such as simultaneous packet data session (e.g. email, browser) and voice.

There are three different classes of GSM/GPRS mobile stations. Class "A" mobile stations support simultaneous operation of GPRS and conventional GSM services. Therefore, class A mobile stations enable simultaneous support of a single circuit-switched session (e.g. voice) and one or more packet-switched sessions (e.g. e-mail). Class "B" mobile stations are able to register for both GPRS and conventional GSM services simultaneously; however, they can only use one of the two services at a given time. Therefore, class B mobile stations support either a circuit-switched session or a packet-switched session, but not both at the same time. Class "C" mobile stations can attach for either GPRS or conventional GSM services; however, with exception to SMS messages, simultaneous registration (and usage) is not possible. Therefore, class C mobile stations, much like class B mobile stations, support either a circuit-switched session or a packet-switched session, but not both at the same time. SMS messages can be exchanged over a circuit-switched session or a packet-switched session depending on network support. Some networks support exchange of SMS messages over only circuit-switched sessions while other networks support exchange of SMS messages over circuit-switched sessions and packet-switched sessions.

Similar class concepts exist in UMTS. GSM/GPRS mobile stations and network currently support only class B operation whereas in general all UMTS devices are considered class A. In release A of 1xEV-DO, multiple simultaneous packet services are supported, and different applications can have different QoS, each associated with the flow of the application. This allows multiple simultaneous asynchronous services such as a VoIP (Voice over IP) call along with other packet data services such as streaming video.

BRIEF DESCRIPTION OF THE DRAWINGS

Preferred embodiments will now be described with reference to the attached drawings in which.

DETAILED DESCRIPTION OF THE PREFERRED EMBODIMENTS

According to one aspect, there is provided a method in a wireless device comprising: upon an event triggering potential user notification: processing the event triggering potential user notification according to customizable voice call settings if there is an active voice call; and processing the event triggering potential user notification according to other settings if there is no active voice call.

In some embodiments, processing comprises: determining based on settings if the event triggering potential user notification triggers a user notification.

In some embodiments, processing further comprises: determining how the user notification is to be executed based on the settings; and generating the user notification.

In some embodiments, the user notification is generated based on the settings with at least one cue selected from a group of cues consisting of audible cue, vibration cue, and visual cue.

In some embodiments, the audible cue is customizable in terms of tune, volume, and number of repetitions; the vibration cue is customizable in terms of frequency, intensity, and number of repetitions; and the visual cue is customizable in terms of frequency, intensity, colour, and number of repetitions.

In some embodiments, the audible cue is generated from at least one source selected from a group of sources consisting of an earpiece, and a notification speaker; the vibration cue is generated from a motor having an unbalanced mechanical load; the visual cue is generated from a user interface, the user interface comprising an LED (light emitting diode).

In some embodiments, the event triggering potential user notification is selected from a group of event types consisting of: completing a data download; an upcoming calendar event; receiving an electronic message; an upcoming task; starting of any service; low battery detected; and low signal detected.

In some embodiments, starting of any service comprises starting of any streaming packet-switched service.

In some embodiments, starting of any streaming packet-switched service comprises starting of a subscribed BCMS (broadcast multicast service).

In some embodiments, the voice call is a packet-switched call.

In some embodiments, the packet-switched call is a VoIP (voice over IP) call.

According to another broad aspect, there is provided a graphical user interface for a wireless device, the graphical user interface comprising: a first area for displaying an identification of an event type subject to customizable event notification; and a second area for displaying configurable options for customizing event notifications for the event type.

Telephony-Enabled Device & Event Processing

Figure 1A:
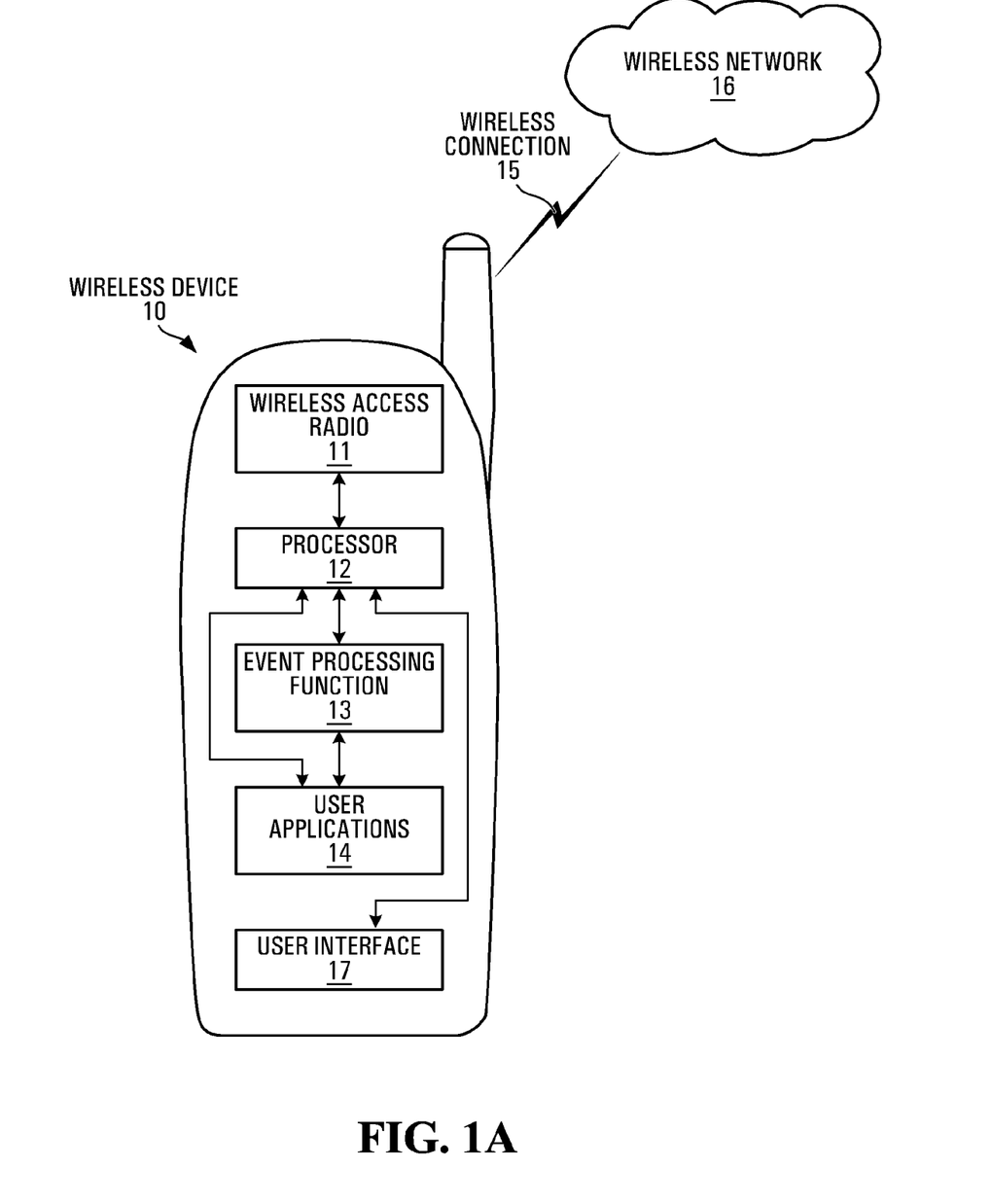
FIG. 1A is a schematic drawing of an example wireless device.

Referring now to FIG. 1A, shown is a schematic drawing of an example wireless device 10. The wireless device 10 has a processor 12 coupled to a wireless access radio 11, an event processing function 13, user applications 14, and a user interface 17. The event processing function 13 is coupled to the user applications 14. The wireless device 10 is coupled to a wireless network 16 through a wireless connection 15.

In operation, the wireless device 10 uses the wireless access radio 11 to communicate wirelessly with the wireless network 16 via the wireless connection 15. The wireless network 16 may be, for example, a cellular network.

There are many possible applications and/or services that can be included by the user applications 14. In some embodiments, the user applications 14 include an email application adapted to send and receive email messages. In some embodiments, the user applications 14 include an Internet browser application adapted to browse Internet sites. In some embodiments, the user applications 14 include a calendar and journal application adapted to maintain an identification of tasks and/or events and provide task and/or event scheduling functionality.

In some instances, it is desirable for a user of the wireless device 10 to be notified upon occurrence of certain events. For example, if an email is received, it may be helpful for the user to be notified of the email. In a second example, if the user previously scheduled an event/task, then it may be desirable for the user to be notified before the event/task is to occur. However, if the frequency of such notifications is large, and a user is simultaneously occupied by a voice call, generating a notification for every such event could become cumbersome or undesirable.

According to one aspect, the event processing function 13 operates to automatically process events triggering potential user notification. More particularly, the event processing function 13 determines based on user customizations if an event is to trigger user notification and the manner in which a user notification is carried out. In doing so, the event processing function 13 takes into account whether or not there is an active voice call in progress. Such events are referred to as "events triggering potential notification" because they are events that may or may not trigger notification depending on the settings at a given instant. If a user notification is triggered during an active voice call, then the user notification is executed according to user customizations. In some embodiments, the event processing function 13 is configurable by the user using the user interface 17 so that they may customize event triggering and event notifications.

Generally, embodiments provide for the customizable notification of events that occur during a voice call. Different wireless devices support the delivery of voice calls using different technologies, typically depending upon one or more standards being implemented by each device. For example, the voice call may be packet-switched (e.g. voice over IP on EVDO), or circuit switched (e.g. dedicated voice channel of UMTS). In yet a further example, the voice call may be a voice plus video call implemented using packet-switched or circuit-switched communications. Some wireless devices support concurrent voice (be it circuit-switched or packet-switched) and one or more additional packet-switched services. An example of such a packet-switched service is an e-mail service.

The events requiring notification are defined on an implementation specific basis to include any event for which it is desired to provide notification customizability during a voice call. These may include events that occur internally to the wireless device (e.g. calendar events), and/or events that occur externally to the wireless device (e.g. events associated with one or more additional packet-switched services that may be supported by a given wireless device). Preferably, the event processing function 13 is software implemented and is executed by the processor 12. However, more generally, the event processing function 13 may be implemented as software, hardware, firmware, or as any appropriate combination of software, hardware and firmware. Although shown as separate components, the user applications 14 and the event processing function 13 may be integrated together as a single component and implemented as software, hardware, firmware, or as any appropriate combination of software, hardware, firmware.

Figure 1B:
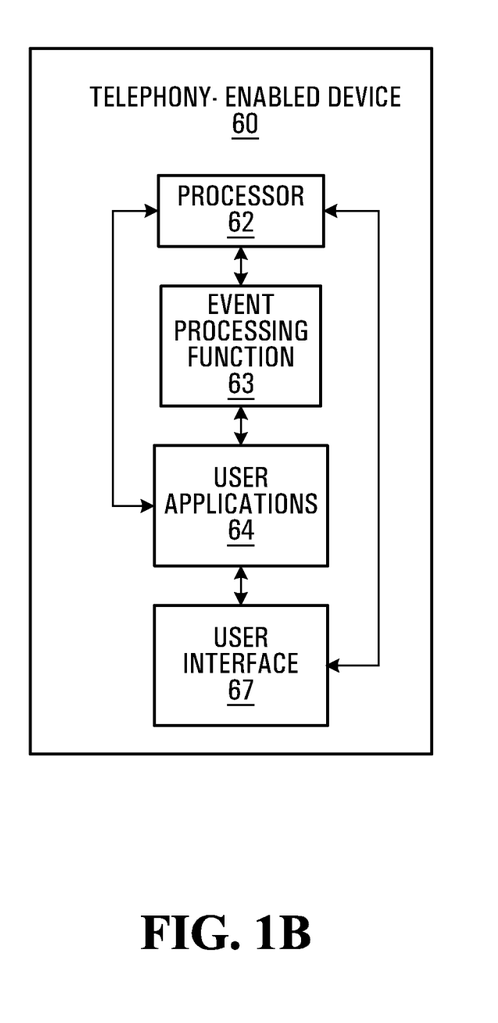
FIG. 1B is a schematic drawing of an example telephony-enabled device.

Embodiments have been discussed with reference to a particular telephony-enable device, namely the wireless device 10 shown in FIG. 1A. More generally, in other embodiments, similar methods are applicable on any telephony-enabled device that may or may not be a wireless device. Referring now to FIG. 1B, shown is a schematic drawing of an example telephony-enabled device 60. The telephony-enabled device 10 has a processor 62 coupled to an event processing function 63, user applications 64, and a user interface 67. The event processing function 63 is coupled to the user applications 14.

In operation, the event processing function 63 operates to automatically process events triggering potential user notification much like the event processing function 13 of the wireless device 10. Preferably, the event processing function 63 is software implemented and is executed by the processor 62. However, more generally, the event processing function 63 may be implemented as software, hardware, firmware, or as any appropriate combination of software, hardware and firmware. Although shown as separate components, the user applications 64 and the event processing function 63 may be integrated together as a single component and implemented as software, hardware, firmware, or as any appropriate combination of software, hardware and firmware.

Customizable Event Trigger & Event Notification

Figure 2:
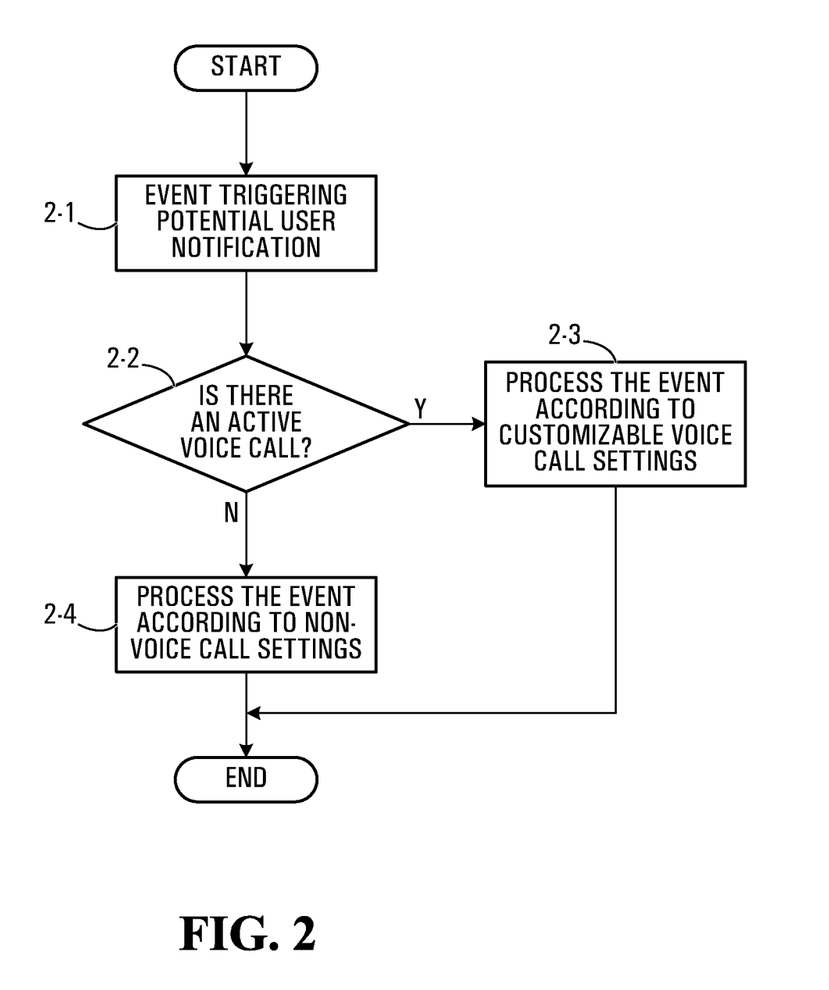
FIG. 2 is a flowchart of an example method of processing an event according to user-customized settings.

Referring now to FIG. 2, shown is a flowchart of an example method of processing an event according to user-customized settings. This method may be implemented in a wireless device, for example by the event processing function 13 of the wireless device 10. If an event triggering potential user notification occurs at step 2-1, then at step 2-2 the wireless device determines whether or not there is an active voice call at step 2-2. If the wireless device determines that there is an active voice call, then at step 2-3 the wireless device processes the event according to customized voice call settings. However, if the wireless device determines that there isn't an active voice call, then at step 2-4 the wireless device processes the event according to non-voice call settings. In some embodiments, the non-voice call settings are also customizable, and this is assumed for the remainder of this example. However, it is to be understood that static non-voice call settings could alternatively be used.

Processing an event generally refers to determining whether or not the event is to trigger a user notification and determining how the user is to be notified. Processing an event is executed according to user customizations. Preferably, determining whether or not an event is to trigger a user notification and determining how to notify the user is to be notified are both executed according to user customizations. The user customizations are tailored towards a plurality of states. In this example, two states are provided: voice call state, and non-voice call state. The user customizations are independent for each state. Therefore, events can be processed in a different manner during an active voice call than when there is no active voice call.

There are many possible events that can trigger potential user notification. As indicated previously, the particular events that will be handled in this manner are defined on an implementation specific basis, and may include internally and/or externally triggered events. In some embodiments, receiving any electronic message triggers event processing, determination of whether or not the user is to be notified, and the way in which the user is to be notified. There are many different kinds of electronic messages. An email message is an example of an electronic message.

In some embodiments, email messages contain a priority indication, for example inside a header of the email message. The header may include an indication of priority as being either "high", "normal", or "low". The user may, for example, provide customizations such that receiving email messages having a "high" priority trigger user notifications during an active voice call while all other electronic messages do not trigger user notification. There are many other possible customizations that the user may provide according to their preferences.

In other embodiments, if the user previously scheduled an event/task using an event/task scheduling application, then processing is triggered before the event/task is to occur in order to determine if the user is to be notified and the way in which the user is to be notified. In some embodiments, the user can specify which events/tasks trigger a user notification. For example, if the user perceives a certain event/task to be unimportant, then they can specify to not be interrupted while having an active voice call upon the certain event/task. In some embodiments, the user can specify the amount of warning to be provided for certain events/tasks. For example, the user may provide customized settings to provide a notification of a scheduled meeting only 5 minutes before the scheduled meeting if it is held locally within the same building of the user. In another example, the user may provide customized settings to provide a notification at least 30 minutes before the scheduled meeting if it is held elsewhere. In yet another example, the user may provide customized settings to provide a plurality of notifications, each notification being separated with a preconfigured time duration.

In further embodiments, if a subscribed BCMCS (broadcast multicast service) is about to begin, then processing is triggered in order to determine if the user is to be notified and the way in which the user is to be notified. In some embodiments, the wireless device determines when a subscribed BCMCS is about to begin by polling, as BCMS is not a push service. This is applicable to, for example, cdma2000 1×EV-DO mobiles that can receive and subscribe to BCMCS services and the notification may come while the user is in a VoIP call. A BCMCS is a very specific streaming packet-switched service. More generally, processing may be triggered upon starting of any service.

Preferably, the user customizations can be separately set for each different event type. For example, to enter the customizations, a user interface might present on a display screen a list of events subject to customizable notification such as listed below:
  Browser
  Calendar
  Level 1 Messages
  Message
  Phone
  SMS (short message service)
  MMS (multimedia message service)
  BCMCS (broadcast multicast service)
  Battery
  Signal
  Tasks.

In this example, the user can select any one of the event types in the list to customize how the events are to be handled. It is to be clearly understood this very specific list is simply an example. More generally, any event type or set of event types may be included.

In some embodiments, a user can separately configure each event type in order to configure which events are to trigger notification and the manner in which notifications are carried out. The "Browser" event refers to events associated with an Internet browser. An example of a browser event is the notification generated when downloading of data completes. The "Calendar" event type refers to events associated with an electronic calendar. The user may, for example, customize if and how user notifications are executed upon certain events. The "Level 1 Messages" event type refers to events associated with email messages having a "high" priority. The user may, for example, customize if and how user notifications are executed upon receiving a "high" priority email. The "Message" event type refers to events associated with an electronic message application. The user may, for example, customize if and how user notifications are executed upon receiving certain email messages. Selecting the "Phone" event type refers to events associated with voice calls. The user may, for example, customize if and how user notifications are executed upon receiving a voice call. The "SMS" event type refers to events associated with an SMS application. The user may, for example, configure if and how user notifications are executed upon receiving certain SMS messages. The "MMS" event type refers to events associated with an MMS application. The user may, for example, configure if and how user notifications are executed upon receiving certain MMS messages. The "BCMCS" event type refers to events associated with a BCMCS application. The user may, for example, configure if and how user notifications are executed upon the beginning of a subscribed BCMCS. The "Battery" event type refers to events associated with a Battery application. The user may, for example, configure if and how user notifications are executed upon detecting that the battery is weak. The "Signal" event type refers to events associated with a Signal application. The user may, for example, configure if and how user notifications are executed detecting that a wireless signal is weak. The "Tasks" event type refers to events associated with a task application. The user may, for example, configure if and how user notifications are executed upon certain milestones of certain tasks.

In some embodiments, the user customizations are tailored towards a plurality of states and processing is executed as a function of the current state. In the example shown in FIG. 2, processing is executed as a function of whether or not there is an active voice call. There are many possible ways to determine if there is an active voice call. In some embodiments, the wireless device keeps track of the user's actions. As a first example, whenever the user places a call and has not completed the call yet, then the wireless device determines that there is an active voice call. As a second example, whenever the user accepts an incoming call and has not completed the call, then the wireless device determines that there is an active voice call. In other embodiments, the wireless device monitors activity of its wireless access radio. In further embodiments, the wireless device monitors the user's activities and monitors activity of the wireless access radio.

There are many customizable ways that the wireless device can provide user notifications. The user can be notified in any appropriate manner capable of distracting the user. In some embodiments, the wireless device can notify the user using a vibration cue. In some embodiments, the wireless device can be configured to vibrate differently for different events. For example, vibration frequency, intensity, and number of repetitions can be configured. This can allow the user to associate certain vibration schemes with certain events.

In other embodiments, the wireless device can notify the user using an audio cue. There are many ways that the wireless device can produce an audio cue. In some embodiments, the wireless device has a notification speaker for generating audio cues. In other embodiments, the wireless device generates audio cues through an earpiece. In further embodiments, the wireless device generates audio cues through a notification speaker and an earpiece. Preferably, the wireless device can be configured to play audio cues with customizable tunes, volume levels, and number of repetitions. Configuring the tune, volume, and number of repetitions of an audio notification can allow the user to associate certain audio notifications with certain events.

In further embodiments, the wireless device can notify the user using a visible cue, for example a flashing LED (light emitting diode). In some embodiments, the wireless device can be configured to flash the LED with customizable frequency, intensity, number of repetitions, and color. Some users may prefer an LED notification in some instances ahead of other forms of notification, as LED notifications are fairly passive and do not abruptly interrupt the user.

In yet other embodiments, the wireless device can notify the user using a selected multiple notification types. For example, the wireless device can flash an LED on and off while playing an audible tune. More generally, a plurality of notification types consisting of sound cues, vibration cues, and visible cues are possible. In some embodiments, the user specifies at least one an additional parameter for customizing the notification type. For example, a notification type having an audible cue might be customized with an additional parameter supplied by the user specifying the volume of the audible cue.

Preferably, the way in which user notifications are executed can be separately set for each different event type. For example, to enter customizations for a given event, a user interface might present on a display screen a list of configurable options for customizing user notifications such as listed below:

Type—none/tune/vibrate/vibrate+tune
Tune—menu of tunes
Volume
Number of Repetitions
LED flashing—enable/disable In this example, the user can select any one of the items in the list to customize user notification options. It is to be clearly understood this very specific list is simply an example and that other configurable options may be contemplated.

In some embodiments, a user can separately configure each option in order to customize the manner in which notifications are carried out. For a certain event triggering potential user notification, the "Type" of notification can be set to none, tune, vibrate, or vibrate and tune. For a certain event triggering potential user notification, the "Tune" can be set to any one of a plurality of tunes. For a certain event triggering potential user notification, the "Volume" of the tune can be customized. For a certain event triggering potential user notification, the "Number of Repetitions" of the tune can be customized. For a certain event triggering potential user notification, the "LED flashing" can be enabled or disabled. With reference to FIG. 2, processing has been described for two example states: active voice call state, and no active voice call state. Many other states are possible. In some embodiments, a device holster is provided for holding the wireless device. In some embodiments, processing of events is dependent on whether or not the wireless device is inside the device holster. Accordingly, the wireless device determines whether or not it is inside the device holster and whether or not it is on a voice call and processes events in more than two states.

In the example method described above with reference to FIG. 2, the telephony-enabled device is assumed to be a wireless device. However, in other embodiments, the method may be implemented in any telephony-enabled device, for example, by the event processing function 63 of the telephony-enabled device 60.

As described earlier with reference to FIG. 1A, it is not necessary for the telephony-enabled device to be able to send and receive data during a voice call. There are many possible applications that can trigger a potential user notification during a voice call without sending or receiving data. As an example, a calendar application may trigger a potential user notification upon an upcoming event/task during a voice call without sending or receiving data. However, preferably the telephony-enabled device is able to send and receive data during a voice call so that applications that send and receive data may do so during a voice call. For example, it is preferred that an email application can send and receive data during a voice call thereby providing the user with the option of being notified upon receiving certain email messages during a voice call.

Device Holster

Figure 3:
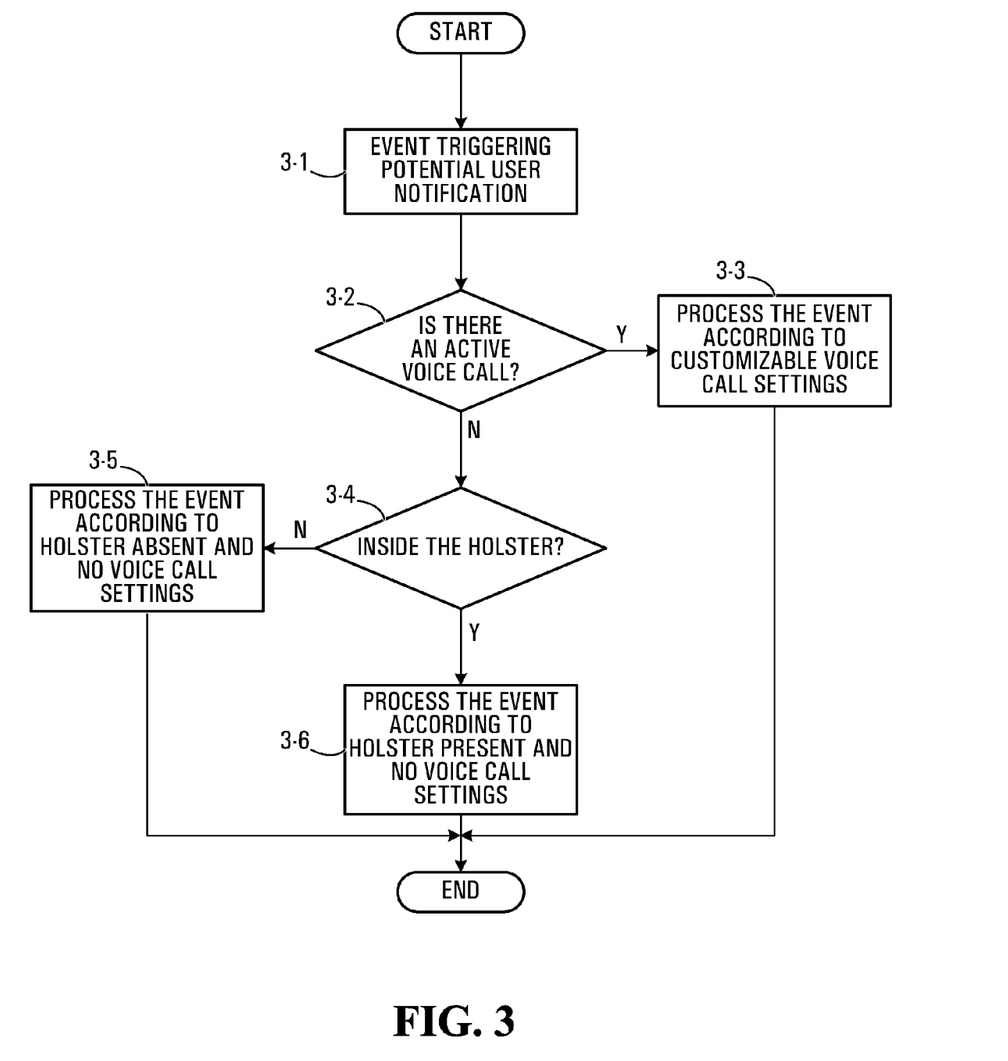
FIG. 3 is a flowchart of another example method of processing an event according to user-customized settings.

Turning now to FIG. 3, shown is a flowchart of another example method of processing an event according to user-customized settings for an implementation in which consideration is given as to whether or not the wireless device is inside a device holster. This method may be implemented in a wireless device, for example by the event processing function 13 of the wireless device 10. Steps 3-1 through 3-3 are substantially identical to steps 2-1 through 2-3 in FIG. 2; therefore, their descriptions will not be repeated. If at step 3-4 the wireless device determines that it is inside the device holster, then at step 3-5 the wireless device processes the event according to holster present and no voice call settings. However, if the wireless device determines that it is not inside the device holster, then at step 3-6 the wireless device processes the event according to holster absent and no voice call settings.

With reference to FIG. 2, several examples of customized event processing have been described with regards to two states: voice call state and no voice call state. These examples are also relevant to the method of FIG. 3. However, the holster present and holster absent states of FIG. 3 enable further customizations over the non-voice call state of FIG. 2. This may be advantageous to the user, for example if they desire to be notified of events in a different manner when the wireless device is inside the device holster than when it is not. In this particular example, the voice call settings can be seen to take precedence over the holster settings. This is preferred in situations in which the user is occupied with an active voice call while the wireless device is inside the device holster. In some embodiments, the holster present and no voice call settings and the holster absent and no voice call settings are also customizable. However, it is to be understood that static non-voice call settings could alternatively be used.

There are many ways in which the wireless device can determine if it is inside the device holster. In some embodiments, the wireless device detects presence of a magnet inside the device holster.

In the example method described above with reference to FIG. 3, the telephony-enabled device is assumed to be a wireless device. However, in other embodiments, the method may be implemented in any telephony-enabled device, for example, by the event processing function 63 of the telephony-enabled device 60.

User Interface

Figure 4:
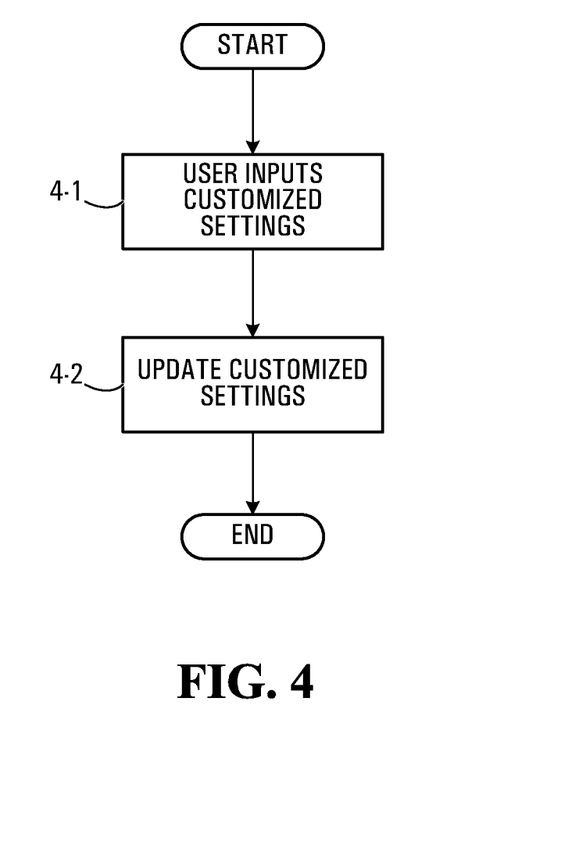
FIG. 4 is a flowchart of an example method of updating customized settings.

On an ongoing basis, the wireless device maintains user customized settings for determining whether or not an event is to trigger user notification and how the user is to be notified. As previously discussed, the user interface of the wireless device may be used to input user customizations. Turning now to FIG. 4, shown is a flowchart of an example method of updating customized settings. This method may be implemented in a wireless device, for example by the event processing function 13 of the wireless device 10. If the user inputs customizations at step 4-1, then at step 4-2 the customized settings are updated.

In the example method described above with reference to FIG. 4, the telephony-enabled device is assumed to be a wireless device. However, in other embodiments, the method may be implemented in any telephony-enabled device, for example, by the event processing function 63 of the telephony-enabled device 60.

Numerous modifications and variations of the present application are possible in light of the above teachings. It is therefore to be understood that within the scope of the appended claims, the application may be practised otherwise than as specifically described herein.

Copyright Notice

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A method in a telephony-enabled device comprising:
   for each of at least two states of the telephony-enabled device, receiving user customized notification settings for a plurality of event types including event types that occur internally to the telephony-enabled device, the notification settings determining a user notification of an event:
   upon an event triggering a potential user notification, the event triggering the potential user notification being one of said plurality of event types;
   processing the event triggering the potential user notification according to the user customized notification settings for the event type of the event for a current state of the telephony-enabled device;
   wherein the at least two states comprise:
   at least one state in which there is an active voice call; and
   at least one state in which there is no active voice call.

2. The method of claim 1 further wherein the at least one state in which there is no active voice call comprises:
   a first state in which there is no active voice call and the telephony-enabled device is in a holster; and
   a second state in which there is no active voice call and there is no device holster.

3. The method of claim 1 wherein processing comprises at least one of:
   processing the event triggering the potential user notification according to voice call settings if there is an active voice call;
   processing the event triggering the potential user notification according to holster present and no voice call settings if there is no active voice call and a device holster is detected; and
   processing the event triggering the potential user notification according to holster absent and no voice call settings if there is no active voice call and a device holster is not detected.

4. The method of claim 1 where receiving user customized notification settings comprises:
   receiving a user selection of a selected notification type of a plurality of possible notification types.

5. The method of claim 4 wherein receiving the user customized notification settings further comprises:
   receiving a user selection of at least one additional parameter defining the selected notification type.

6. The method of claim 4 wherein the notification types comprise at least types consisting of: audible/sound cues, vibration cues, and/or visible cues.

7. The method of claim 5 wherein:
   the at least one additional parameter comprises at least one of:
   for audible cues: tune, volume, and number of repetitions;
   for vibration cues, frequency, intensity, and number of repetitions; and
   for visible cues: frequency, intensity, colour, and number of repetitions.

8. The method of claim 1 wherein the customized notification settings are individually configurable for the plurality of event types.

9. The method of claim 1 wherein processing comprises:
   determining based on the user customized notification settings if the event triggering the potential user notification triggers a user notification.

10. The method of claim 9 wherein processing further comprises:
    determining how the user notification is to be executed based on the user customized notification settings; and
    generating the user notification.

11. The method of claim 10 wherein:
    the user notification is generated based on the user customized notification settings with at least one cue comprising an audible cue, a vibration cue, and/or a visual cue.

12. The method of claim 1 wherein the event triggering the potential user notification comprises any one or a combination of: completing a data download; an upcoming calendar event; receiving an electronic message; an upcoming task; starting of any service; low battery detected; and/or low signal detected.

13. The method of claim 12 wherein starting of any service comprises starting of any streaming packet-switched service.

14. The method of claim 13 wherein starting of any streaming packet-switched service comprises starting of a subscribed broadcast multicast service 'BCMS'.

15. The method of claim 1 wherein the event triggering the potential user notification is in respect of at least one service of a plurality of concurrent circuit-switched and packet-switched services handled by the telephony-enabled device.

16. The method of claim 1 wherein the active voice call comprises video.

17. The method of claim 1 wherein the active voice call is a circuit-switched call.

18. The method of claim 1 wherein the active voice call is a packet-switched call.

19. A telephony-enabled device configured to implement the method of claim 1.

20. The telephony-enabled device of claim 19, wherein said device is a wireless device.

21. A non-transitory computer readable medium having computer executable instructions stored thereon for execution on a telephony-enabled device so as to implement the method of claim 1.

22. A communications system comprising at least one telephony-enabled device according to claim 19.

* * * * *